(12) United States Patent
Yang et al.

(10) Patent No.: US 12,411,049 B2
(45) Date of Patent: Sep. 9, 2025

(54) TEMPERATURE COEFFICIENT OF OFFSET COMPENSATION FOR RESISTANCE BRIDGE

(71) Applicant: Qorvo US, Inc., Greensboro, NC (US)

(72) Inventors: Mong Yang, Santa Clara, CA (US); Julius Minglin Tsai, San Jose, CA (US)

(73) Assignee: Qorvo US, Inc., Greensboro, NC (US)

( * ) Notice: Subject to any disclaimer, the term of this patent is extended or adjusted under 35 U.S.C. 154(b) by 291 days.

(21) Appl. No.: 18/205,614

(22) Filed: Jun. 5, 2023

(65) Prior Publication Data

US 2024/0019321 A1    Jan. 18, 2024

Related U.S. Application Data

(60) Provisional application No. 63/368,556, filed on Jul. 15, 2022.

(51) Int. Cl.
*G01L 1/22* (2006.01)
*G01L 9/04* (2006.01)
*G01L 9/06* (2006.01)

(52) U.S. Cl.
CPC ........... *G01L 1/2281* (2013.01); *G01L 9/045* (2013.01); *G01L 9/06* (2013.01); *G01L 9/065* (2013.01)

(58) Field of Classification Search
CPC . G01L 19/147; G01L 9/0072; G01L 19/0645; G01L 19/0084; G01L 13/025; G01L 19/0007; G01L 19/0038; G01L 9/0042; G01L 9/0073; G01L 9/0075; G01L 9/0054; G01L 9/0055; G01L 19/04; G01L 7/00; G01L 7/04; G01L 19/148; G01L 19/14; G01L 19/143; G01L 17/00; G01L 7/18; G01L 19/0092; G01L 15/00; G01L 9/0051; G01L 7/041; G01L 9/12; G01L 9/065; G01L 19/0618; G01L 9/0052; G01L 9/125; G01L 7/16; G01L 19/0609; G01L 19/003; G01L 9/007; G01L 19/0627; G01L 19/0046; G01L 9/0022; G01L 9/06; G01L 19/0636; G01L 7/084; G01L 13/02; G01L 19/0023; G01L 19/142; G01L 7/043;

(Continued)

(56) References Cited

U.S. PATENT DOCUMENTS 5,877,423 A    3/1999    Mattsson
10,038,426 B2  7/2018    Bertin (Continued)

FOREIGN PATENT DOCUMENTS

| CN | 106873702 A | 6/2017 | |
| CN | 209859028 U | 12/2019 | |
| WO | WO-9320417 A1 * | 10/1993 | ............... G01L 1/18 |

*Primary Examiner* — Andre J Allen
(74) *Attorney, Agent, or Firm* — Withrow & Terranova, P.L.L.C.

(57) ABSTRACT

Systems and methods for temperature coefficient of offset compensation for a resistance bridge are disclosed. In one aspect, one or more current sources are added in parallel to resistance elements within a resistance bridge. The current source(s) may be selectively switched on and adjusted by a control circuit based on readings from a temperature sensor. In this fashion, the temperature induced variations in the resistance may be canceled or corrected allowing for better performance of the resistance bridge.

16 Claims, 4 Drawing Sheets

(58) Field of Classification Search
CPC ....... G01L 19/08; G01L 9/0002; G01L 19/02; G01L 9/008; G01L 19/141; G01L 9/006; G01L 11/02; G01L 19/0672; G01L 23/10; G01L 23/18; G01L 19/0681; G01L 9/0077; G01L 19/12; G01L 27/005; G01L 7/082; G01L 9/0044; G01L 19/0015; G01L 19/0069; G01L 7/063; G01L 9/0001; G01L 19/146; G01L 21/12; G01L 27/002; G01L 27/007; G01L 9/16; G01L 11/00; G01L 19/00; G01L 9/0026; G01L 9/0089; G01L 9/045; G01L 9/14; G01L 19/0654; G01L 1/2281; G01L 11/025; G01L 13/026; G01L 11/008; G01L 7/22; G01L 13/00; G01L 9/0047; G01L 7/08; G01L 9/0076; G01L 9/0025; G01L 9/0035; G01L 9/0005; G01L 9/0041; G01L 19/0061; G01L 9/0019; G01L 9/08; G01L 9/10; G01L 21/00; G01L 11/006; G01L 9/04; G01L 19/086; G01L 9/0008; G01L 1/18; G01L 9/00; G01L 11/004; G01L 19/069; G01L 9/0057; G01L 19/083; G01L 19/10; G01L 19/16; G01L 19/06; G01L 9/0016; G01L 13/023; G01L 7/048; G01L 9/0048; G01L 9/0027; G01L 9/0086; G01L 9/0079; G01L 11/04; G01L 1/20; G01L 9/0091; G01L 27/00; G01L 11/002; G01L 23/24; G01L 7/182; G01L 1/02; G01L 19/0663; G01L 7/166; G01L 23/22; G01L 9/0036; G01L 9/0061; G01L 9/0039; G01L 23/125; G01L 19/145; G01L 9/0013; G01L 21/04; G01L 9/0045; G01L 9/0092; G01L 1/142; G01L 7/104; G01L 9/0033; G01L 9/0083; G01L 9/0098; G01L 1/2293; G01L 7/24; G01L 9/02; G01L 21/22; G01L 9/0029; G01L 7/022; G01L 1/205; G01L 9/0064; G01L 23/08; G01L 5/14; G01L 23/16; G01L 7/088; G01L 7/163; G01L 9/0007; G01L 13/06; G01L 23/222; G01L 1/16; G01L 1/2287; G01L 9/0085; G01L 9/025; G01L 1/2212; G01L 21/14; G01L 9/0004; G01L 23/02; G01L 9/003; G01L 9/085; G01L 1/14; G01L 1/148; G01L 9/0058; G01L 9/105; G01L 7/02; G01L 7/061; G01L 9/002; G01L 1/2231; G01L 13/028; G01L 9/0095; G01L 23/28; G01L 1/162; G01L 19/0076; G01L 7/12; G01L 9/0038; G01L 9/0032; G01L 21/10; G01L 7/024; G01L 19/149; G01L 1/246; G01L 7/086; G01L 1/005; G01L 5/228; G01L 7/06; G01L 1/2206; G01L 7/102; G01L 13/021; G01L 27/02; G01L 1/2262; G01L 1/24; G01L 1/26; G01L 23/00; G01L 9/0094; G01L 19/144; G01L 9/0082; G01L 1/125; G01L 9/0097; G01L 1/146; G01L 1/2268; G01L 11/06; G01L 21/30; G01L 21/34; G01L 23/221; G01L 7/187; G01L 7/20; G01L 23/26; G01L 7/068; G01L 1/144; G01L 1/225; G01L 23/32; G01L 7/14; G01L 1/165; G01L 23/12; G01L 1/241; G01L 13/04; G01L 7/045; G01L 1/086; G01L 1/22; G01L 7/108; G01L 1/086; G01L 1/22; G01L 7/108; G01L 9/18; G01L 1/127; G01L 17/005; G01L 5/18; G01L 1/245; G01L 21/32; G01L 1/183; G01L 1/2218; G01L 9/0023; G01L 1/243; G01L 23/145; G01L 5/0047; G01L 5/0076; G01L 9/0088; G01L 1/106; G01L 1/10; G01L 9/001; G01L 1/186; G01L 23/223; G01L 25/00; G01L 5/165; G01L 5/226; G01L 9/0017; G01L 1/044; G01L 3/245; G01L 9/005; G01L 1/08; G01L 21/16; G01L 3/1485; G01L 5/0038; G01L 5/162; G01L 5/225; G01L 7/026; G01L 7/065; G01L 9/0014; G01L 1/04; G01L 1/242; G01L 21/24; G01L 3/10; G01L 5/0004; G01L 5/0052; G01L 7/10; G01L 1/00; G01L 1/103; G01L 1/2275; G01L 1/247; G01L 21/02; G01L 21/26; G01L 23/225; G01L 3/102; G01L 3/105; G01L 5/223; G01L 5/24; G01L 7/028; G01L 9/0011; G01L 5/00; G01L 5/0028; G01L 5/243; G01L 1/083; G01L 1/12; G01L 21/36; G01L 23/04; G01L 23/14; G01L 23/30; G01L 3/103; G01L 5/0033; G01L 5/102; G01L 5/133; G01L 5/1627; G01L 5/166; G01L 7/185; G01L 1/255; G01L 21/08; G01L 5/0057; G01L 5/22; G01L 1/042; G01L 1/122; G01L 1/2225; G01L 1/2243; G01L 1/2256; G01L 1/248; G01L 2009/0067; G01L 2009/0069; G01L 21/06; G01L 23/06; G01L 3/00; G01L 3/06; G01L 3/1478; G01L 3/1492; G01L 3/18; G01L 3/24; G01L 3/242; G01L 5/0061; G01L 5/08; G01L 5/10; G01L 5/101; G01L 5/108; G01L 5/16; G01L 5/161; G01L 5/167; G01L 5/28; G01L 1/046; G01L 2009/0066; G01L 2019/0053; G01L 23/085; G01L 23/20; G01L 5/0071; G01L 5/008; G01L 5/06; G01L 5/171; G01L 7/106
USPC ..................................................... 73/700–756
See application file for complete search history.

(56) References Cited

U.S. PATENT DOCUMENTS

| | | | | |
|---|---|---|---|---|
| 10,088,532 | B2* | 10/2018 | Ariyama | G01R 33/0082 |
| 10,337,942 | B2* | 7/2019 | Stewart | G01L 27/005 |
| 11,186,479 | B2* | 11/2021 | deKoninck | G01L 9/0072 |
| 11,422,044 | B2* | 8/2022 | Zamprogno | G01L 9/045 |
| 2004/0071191 | A1* | 4/2004 | Sim | G01K 7/015 |
| | | | | 374/185 |
| 2012/0091992 | A1 | 4/2012 | Guziak | |
| 2015/0204746 | A1* | 7/2015 | Bemis | G01L 9/065 |
| | | | | 73/719 |

* cited by examiner

TEMPERATURE COEFFICIENT OF OFFSET COMPENSATION FOR RESISTANCE BRIDGE

PRIORITY APPLICATION

The present application is related to U.S. Patent Provisional Application Ser. No. 63/368,556 filed on Jul. 15, 2022, and entitled "TEMPERATURE COEFFICIENT OF OFFSET COMPENSATION FOR RESISTANCE BRIDGE," the contents of which is incorporated herein by reference in its entirety.

BACKGROUND

I. Field of the Disclosure

The technology of the disclosure relates generally to pressure sensing circuits such as a piezo resistor bridge and, more particularly, to a circuit that provides temperature compensation for the same.

II. Background

Computing devices abound in modern society. The prevalence of these computing devices is driven in part by the many functions that are now enabled on such devices. With the advent of the myriad functions available to such devices, there has been an increase in processing performed by the devices, which, in turn generates heat and causes temperature changes in the circuits that provide these functions. While some circuits are not sensitive to temperature changes, other circuits such as piezoelectric-based pressure sensors are sensitive to temperature changes. One such circuit is a piezo resistor bridge such as may be used in a micro-electrical mechanical system (MEMS) sensor. Such sensitivity provides room for innovation.

SUMMARY

Aspects disclosed in the detailed description include systems and methods for temperature coefficient of offset compensation for a resistance bridge. In particular, exemplary aspects of the present disclosure contemplate adding one or more current sources in parallel to resistance elements within a resistance bridge. The current source(s) may be selectively switched on and adjusted by a control circuit based on readings from a temperature sensor. In this fashion, the temperature-induced variations in the resistance may be canceled or corrected allowing for better performance of the resistance bridge.

In this regard in one aspect, a pressure sensor is disclosed. The pressure sensor comprises a resistance bridge. The resistance bridge comprises a first resistor positioned between a first terminal node and a second terminal node. The resistance bridge also comprises a second resistor positioned between the first terminal node and a third terminal node. The resistance bridge also comprises a third resistor positioned between the second terminal node and a fourth terminal node. The resistance bridge also comprises a fourth resistor positioned between the third and fourth terminal nodes. The pressure sensor also comprises at least one current source associated with and electrically parallel to a respective one of the first through fourth resistors. The pressure sensor also comprises a switch associated with the at least one current source and configured to couple selectively the at least one current source to the respective one of the first through fourth resistors.

In another aspect, a device is disclosed. The device comprises a pressure sensor. The pressure sensor comprises a resistance bridge. The resistance bridge comprises a first resistor positioned between a first terminal node and a second terminal node. The resistance bridge also comprises a second resistor positioned between the first terminal node and a third terminal node. The resistance bridge also comprises a third resistor positioned between the second terminal node and a fourth terminal node. The resistance bridge also comprises a fourth resistor positioned between the third and fourth terminal nodes. The pressure sensor also comprises at least one current source associated with and electrically parallel to a respective one of the first through fourth resistors. The pressure sensor also comprises a switch associated with the at least one current source and configured to couple selectively the at least one current source to the respective one of the first through fourth resistors. The device also comprises a temperature sensor. The device also comprises a control circuit configured to receive a signal from the temperature sensor and control the switch and the at least one current source to compensate for temperature variations based on the signal.

In another aspect, a method for compensating for temperature variations in a pressure sensor is disclosed. The method comprises detecting a temperature with a temperature sensor. The method also comprises selectively coupling a current source to a resistor in a resistance bridge based on the temperature.

DETAILED DESCRIPTION

Figures 1A, 1B:
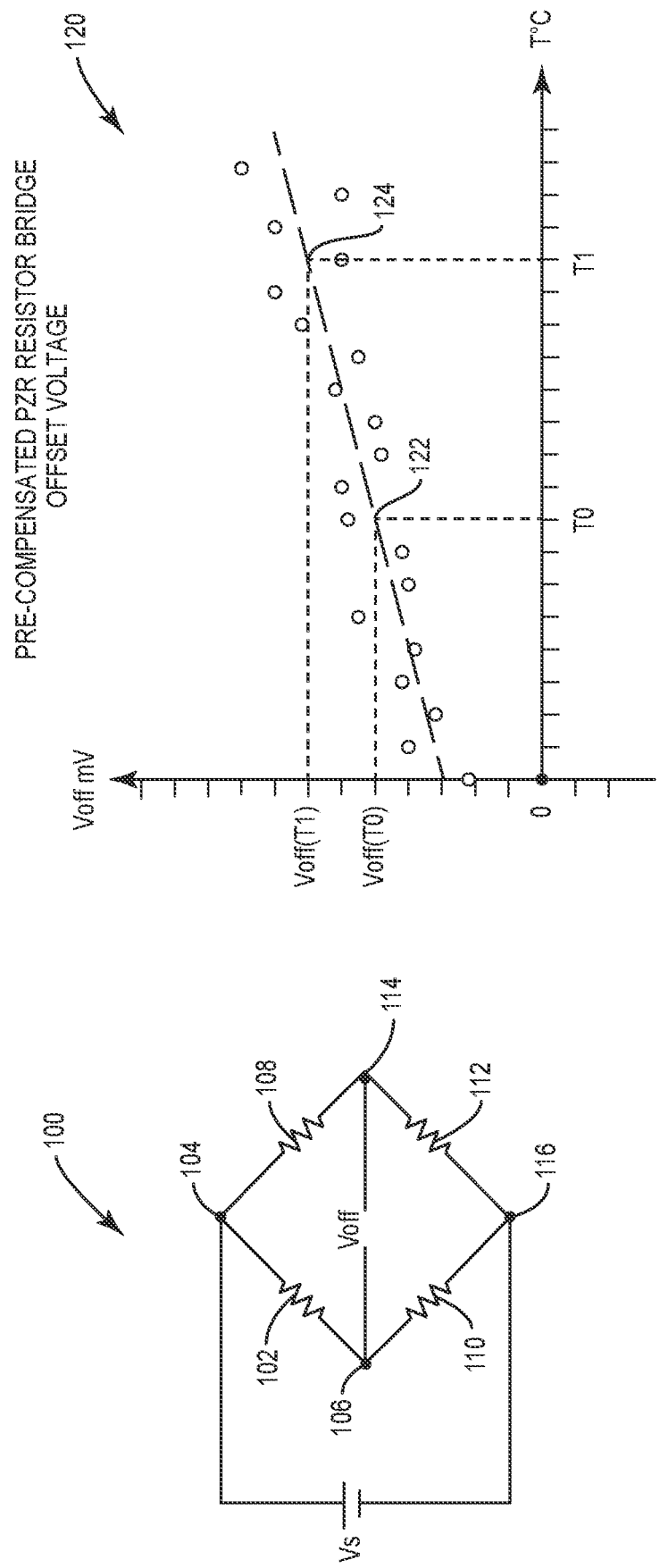
FIG. 1A is a circuit diagram of an exemplary conventional resistance bridge.
FIG. 1B is a graph of temperature versus offset voltage that shows how the offset voltage in the resistance bridge of FIG. 1A can vary with temperature.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element such as a layer, region, or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. Likewise, it will be understood that when an element such as a layer, region, or substrate is referred to as being "over" or extending "over" another element, it can be directly over or extend directly over the other element or intervening elements may also be present. In contrast, when an element is referred to as being "directly over" or extending "directly over" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Aspects disclosed in the detailed description include systems and methods for temperature coefficient of offset compensation for a resistance bridge. In particular, exemplary aspects of the present disclosure contemplate adding one or more current sources in parallel to resistance elements within a resistance bridge. The current source(s) may be selectively switched on and adjusted by a control circuit based on readings from a temperature sensor. In this fashion, the temperature induced variations in the resistance may be canceled or corrected allowing for better performance of the resistance bridge.

Before addressing particular aspects of the present disclosure, an overview of some of the issues with a conventional system are provided with reference to FIGS. 1A and 1B. A discussion of exemplary aspects of the present disclosure begins below with reference to FIG. 2.

In this regard, FIG. 1A is a circuit diagram of a circuit 100 that may, for example, be a Wheatstone bridge circuit and acts as a resistance bridge. Resistance bridges may act as pressure sensors in micro-electrical mechanical systems (MEMS). The circuit 100 may include a first resistor 102 having terminal nodes 104 and 106. A second resistor 108 may couple to the terminal node 104. A third resistor 110 may couple to the terminal node 106. The circuit 100 may further include a fourth resistor 112 having terminal nodes 114 and 116. The second resistor 108 may couple to the terminal node 114, and the third resistor may couple to the terminal node 116. The resistors 102, 108, 110, and 112 may be formed from a piezoelectric material such that when pressure or force is applied to the circuit 100, the resistances of the resistors 102, 108, 110, and 112 may change.

An excitation voltage (Vs) may be applied to the terminal nodes 104 and 116 and an offset voltage (Voff) may be generated between the terminal nodes 106 and 114. When the resistors 102, 108, 110, and 112 are balanced, Voff should be zero (0). When pressure is applied, the piezoelectric nature of the resistors 102, 108, 110, and 112 causes the resistances to change (creating imbalance) and thus generate a value for Voff. Based on the value of Voff, the force being applied may be measured or approximated. In the abstract, this approach works well. However, the resistors 102, 108, 110, and 112 may be temperature sensitive, and, as illustrated in FIG. 1B, this sensitivity may cause Voff to vary as a function of temperature even with no pressure applied.

Specifically, FIG. 1B shows a graph 120 where Voff varies as a function of temperature. Specifically, given a temperature T0, Voff may be a first value 122, but for a second temperature T1>T0, Voff may be a second value 124 greater than the first value 122. Such temperature-induced changes in Voff negatively impact the desired force measurements made by evaluation of Voff. That is, where there is both a force and temperature component to Voff, it may be difficult or impossible to isolate how much force is being applied to the circuit 100.

Exemplary aspects of the present disclosure add one or more current sources to a circuit to provide a compensation current through one or more of the resistances of a resistance bridge. By adjusting current through the resistors, balance may be restored to the bridge, allowing any measured Voff to be just a function of force, which in turn restores the functionality of the resistance bridge as a pressure sensor.

Figure 2:
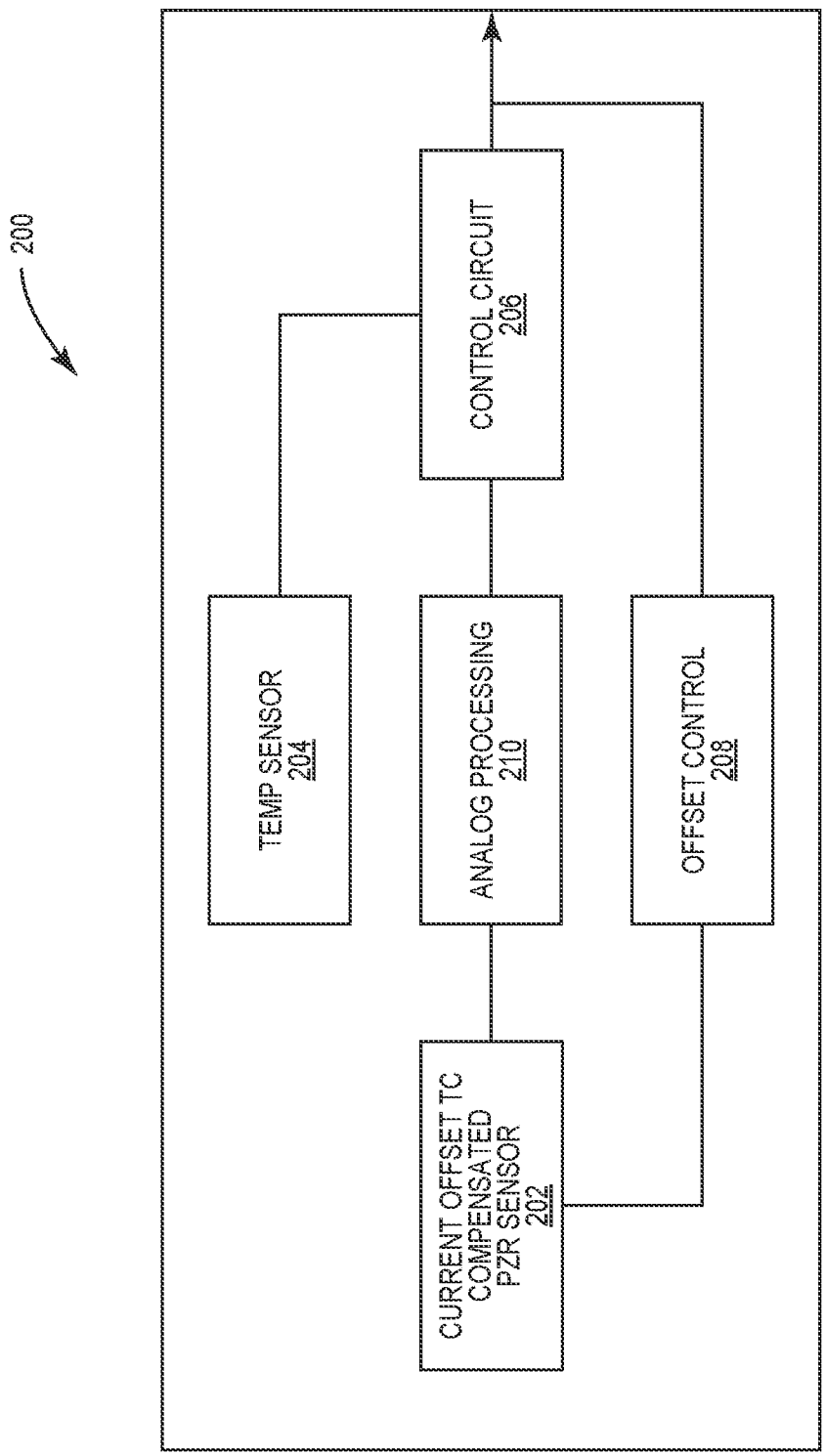
FIG. 2 is block diagram of a device that includes an exemplary temperature-compensated resistance bridge according to the present disclosure.

In this regard, FIG. 2 is a block diagram of a device 200 having a current offset temperature coefficient (TC) compensated pressure sensor 202 (more detail on this sensor 202 in FIG. 3, discussed below). A temperature sensor 204 may be present in the device 200 or located relatively close thereto and provide information related to temperature to a control circuit 206. The control circuit 206 may provide an offset control signal to an offset control circuit 208, which in turn controls elements within the sensor 202. An output from the sensor 202 may be provided to an analog processing circuit 210 which provides a processed signal to the control circuit 206.

Figure 3:
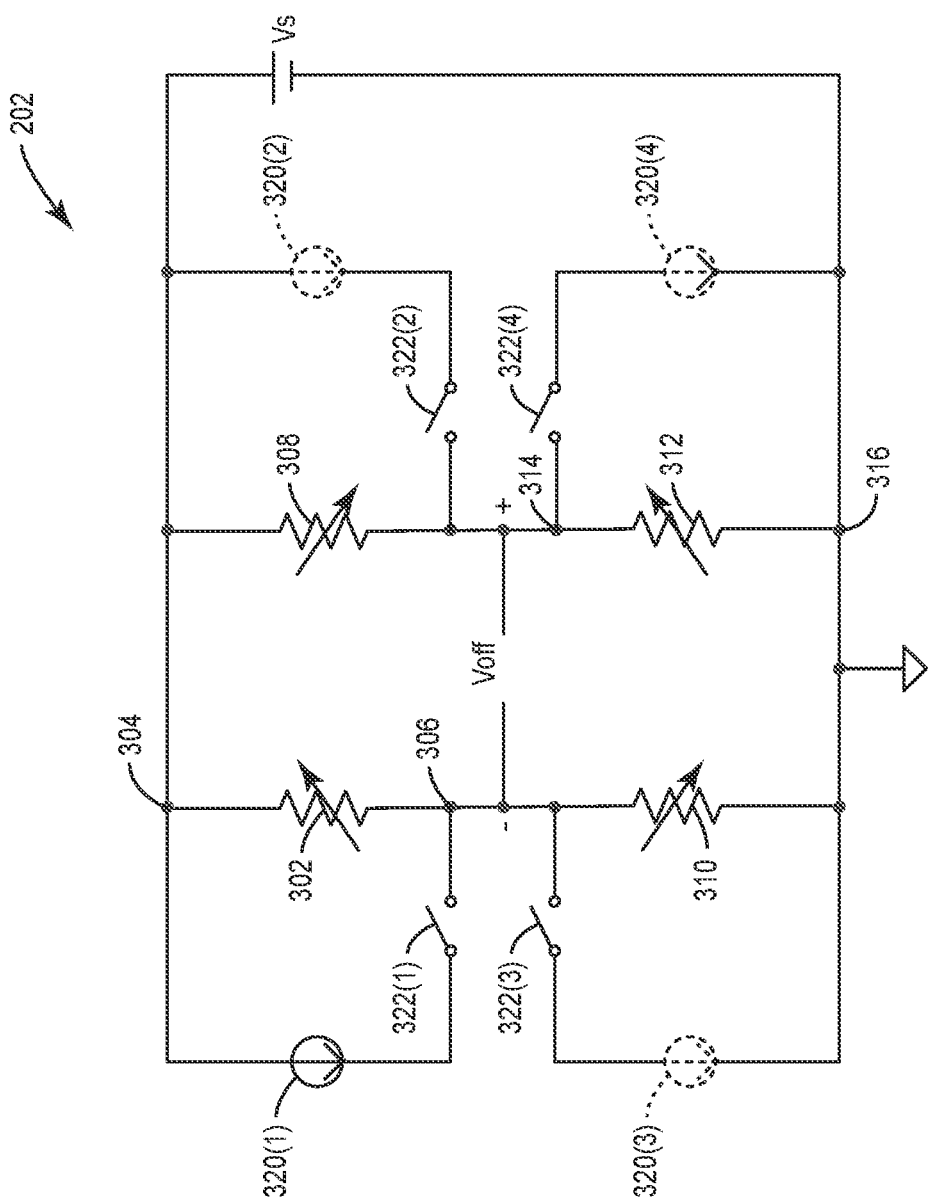
FIG. 3 is a circuit diagram of a resistance bridge with temperature-compensating current sources according to exemplary aspects of the present disclosure.

FIG. 3 illustrates the details of the sensor 202. The sensor 202 may include a first resistor 302 having terminal nodes 304 and 306. A second resistor 308 may couple to the terminal node 304. A third resistor 310 may couple to the terminal node 306. The sensor 202 may further include a fourth resistor 312 having terminal nodes 314 and 316. The second resistor 308 may couple to the terminal node 314, and the third resistor 310 may couple to the terminal node 316. The resistors 302, 308, 310, and 312 may be formed from a piezoelectric material such that when pressure or force is applied to the sensor 202, the resistances of the resistors 302, 308, 310, and 312 may change.

One or more current sources 320(1)-320(4) may be provided electrically in parallel with the resistors 302, 308, 310, and 312, respectively. Switches 322(1)-322(4) may be provided to allow the current sources 320(1)-320(4) to be activated selectively within the sensor 202. The current sources 320(1)-320(4) and the switches 322(1)-322(4) may be controlled by the control circuit 206 or the offset control circuit 208.

In an exemplary aspect, the current sources 320(1)-320(4) may be generated by a bandgap circuit, such that their temperature coefficient is well controlled and can be trimmed by using on-chip registers (not shown) or one time programmable (OTP) memory. It should further be appreciated that the current sources 320(1)-320(4) have relatively large output impedances and thus have negligible effect on sensor sensitivity. Each current source 320(1)-320(4) may be individually turned on or off through the associated switch 322(1)-322(4). Likewise, not all resistors 302, 308, 310, 312 may have an associated current source 320(1)-320(4). While only current source 320(1) is shown in solid lines with the other optional current sources 320(2)-320(4) shown with dotted lines to imply optionality, it should be appreciated that any single one of the current sources 320(1)-320(4) may be present with the other three omitted. Likewise, there may be two or three current sources present. However, for fine balancing, each resistor 302, 308, 310, and 312 has its associated current source 320(1)-320(4). The current sources 320(1)-320(4) may provide positive or negative output voltage offset to correct for temperature variation. In an exemplary aspect, current sources 320(1), 320(4) are used for negative offset correction while current sources 320(2), 320(3) are used for positive offset correction.

It should be appreciated that the current sources 320(1)-320(4) may be proportional-to-absolute temperature (PTAT) current sources or the current sources 320(1)-320(4) may be conversely proportional-to-absolute temperature (CTAT) current sources. When a sensor 202 has a default positive temperature coefficient (i.e., without correction by the present disclosure), the PTAT current sources may be used. When a sensor 202 has a default negative temperature coefficient, CTAT current sources are used.

Figure 4:
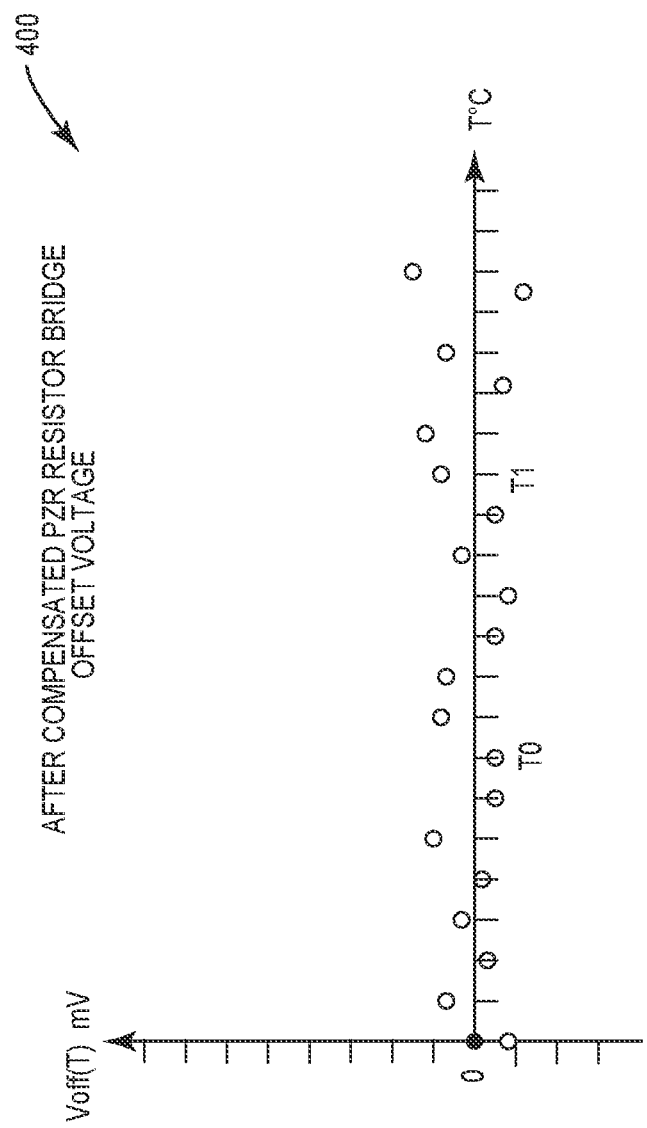
FIG. 4 is a graph of temperature versus offset voltage for the resistance bridge of FIG. 3.

While initial tests are not perfect, these tests show that using the current sources 320(1)-320(4) provides a much more temperature insensitive sensor as shown by graph 400 in FIG. 4, where at temperature T0, Voff(T) is approximately zero and likewise at T1, Voff(T) is also approximately zero.

Providing this temperature compensation effectively reduces or eliminates the dependence of Voff from temperature, thereby providing more linear and predictable operation. Such improved linearity improves the functionality of the sensor without requiring extensive external or over engineer precise resistors. Likewise, there is no need to integrate variability into a complementary metal oxide semiconductor (CMOS) device with its appurtenant margins for error.

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flowchart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations. Thus, the disclosure is not intended to be limited to the examples and designs described herein but is to be accorded the widest scope consistent with the principles and novel features disclosed herein.

What is claimed is:

1. A pressure sensor, comprising:
   a resistance bridge comprising:
      a first resistor positioned between a first terminal node and a second terminal node;
      a second resistor positioned between the first terminal node and a third terminal node;
      a third resistor positioned between the second terminal node and a fourth terminal node; and
      a fourth resistor positioned between the third and fourth terminal nodes;
   at least one current source associated with and electrically parallel to a respective one of the first through fourth resistors; and
   a switch associated with the at least one current source and configured to couple selectively the at least one current source to the respective one of the first through fourth resistors.

2. The pressure sensor of claim 1, wherein the at least one current source comprises four current sources, each of the four current sources associated with and electrically parallel to respective ones of the first through fourth resistors.

3. The pressure sensor of claim 2, further comprising second through fourth switches associated with respective ones of the four current sources and configured to couple selectively the respective ones of the four current sources to respective ones of the first through fourth resistors.

4. The pressure sensor of claim 2, wherein a first of the four current sources comprises a proportional-to-absolute temperature (PTAT) current source.

5. The pressure sensor of claim 4, wherein the PTAT current source is configured to compensate an offset voltage based on a signal from a temperature sensor.

6. The pressure sensor of claim 2, wherein a first of the four current sources comprises a conversely proportional-to-absolute temperature (CTAT) current source.

7. The pressure sensor of claim 6, wherein a second of the four current sources comprises a proportional-to-absolute temperature (PTAT) current source.

8. The pressure sensor of claim 1, wherein the first through fourth resistors comprise piezoelectric material.

9. The pressure sensor of claim 1 integrated into a micro-electrical mechanical system (MEMS) device.

10. The pressure sensor of claim 1, further comprising a voltage source (Vs) coupled to the first and fourth terminal nodes.

11. A device comprising:
a pressure sensor comprising:
  a resistance bridge comprising:
    a first resistor positioned between a first terminal node and a second terminal node;
    a second resistor positioned between the first terminal node and a third terminal node;
    a third resistor positioned between the second terminal node and a fourth terminal node; and
    a fourth resistor positioned between the third and fourth terminal nodes;
  at least one current source associated with and electrically parallel to a respective one of the first through fourth resistors; and
  a switch associated with the at least one current source and configured to couple selectively the at least one current source to the respective one of the first through fourth resistors;
a temperature sensor; and
a control circuit configured to receive a signal from the temperature sensor and control the switch and the at least one current source to compensate for temperature variations based on the signal.

12. A method for compensating for temperature variations in a pressure sensor, the method comprising:
detecting a temperature with a temperature sensor; and
selectively coupling a current source to a resistor in a resistance bridge based on the temperature.

13. The method of claim 12, wherein selectively coupling the current source comprises activating a switch to couple the current source to the resistor.

14. The method of claim 12, wherein selectively coupling the current source comprises selectively coupling at least one of four current sources to a respective resistor in the resistance bridge.

15. The method of claim 12, wherein selectively coupling comprises selectively coupling a proportional-to-absolute temperature (PTAT) current source to the resistor.

16. The method of claim 12, wherein selectively coupling comprises selectively coupling a conversely proportional-to-absolute temperature (CTAT) current source to the resistor.

* * * * *